United States Patent [19]
Doi et al.

[11] Patent Number: 5,219,812
[45] Date of Patent: Jun. 15, 1993

[54] DIELECTRIC CERAMIC COMPOSITION

[75] Inventors: Tetsuya Doi; Takuya Miyagawa; Yasuyuki Naito; Tadashi Morimoto, all of Nagaokakyo, Japan

[73] Assignee: Murata Manufacturing Co., Ltd., Japan

[21] Appl. No.: 838,107

[22] Filed: Feb. 18, 1992

[30] Foreign Application Priority Data

Feb. 18, 1991 [JP] Japan .................... 3-023035

[51] Int. Cl.$^5$ .............................. C04B 35/49
[52] U.S. Cl. .................... 501/138; 501/139
[58] Field of Search .................. 501/138, 139

[56] References Cited

U.S. PATENT DOCUMENTS

| | | | |
|---|---|---|---|
| 5,077,636 | 12/1991 | Saito et al. | 501/138 |
| 5,089,932 | 2/1992 | Saito et al. | 501/138 |

FOREIGN PATENT DOCUMENTS

| | | | |
|---|---|---|---|
| 567074 | 12/1958 | Canada | 501/139 |
| 0187960 | 7/1986 | European Pat. Off. | |
| 0385364 | 9/1990 | European Pat. Off. | |
| 0385365 | 9/1990 | European Pat. Off. | |
| 0431533 | 6/1991 | European Pat. Off. | |
| 3524193 | 1/1986 | Fed. Rep. of Germany | 501/138 |
| 62-157603 | 7/1987 | Japan | |

*Primary Examiner*—Mark L. Bell
*Assistant Examiner*—Deborah Jones
*Attorney, Agent, or Firm*—Ostrolenk, Faber, Gerb & Soffen

[57] ABSTRACT

A dielectric ceramic composition containing 0.3 to 5.0 parts by weight of an additive composed of at least one of $SiO_2$, $Li_2O$ and $B_2O_3$ per 100 parts by weight of a main component expressed by the following composition formula:

$$(1-x-y-z-t)BaTiO_3 + xCaZrO_3 + yMgO + zMnO + tRe_2O_3,$$

where
$x \leq 0.06$
$0.005 \leq y \leq 0.08$
$0.005 \leq z \leq 0.02$
$0.005 \leq t \leq 0.02$.

In the composition formula, Re indicates at least one of Y, Gd, Dy, Ho, Er and Yb.

6 Claims, No Drawings

DIELECTRIC CERAMIC COMPOSITION

BACKGROUND OF THE INVENTION

1. Field of the Invention

The present invention relates to a dielectric ceramic composition used to obtain a monolithic type electronic component constructed by cofiring inner electrodes and ceramics, for example, a ceramic capacitor.

2. Description of the Prior Art

In a monolithic type electronic component such as a multilayer capacitor, a sintered body obtained by cofiring an electrode material constituting inner electrodes and dielectric ceramics is used. Meanwhile, when the multilayer capacitor is fabricated, a conventional dielectric material mainly composed of $BaTiO_3$ is sintered at temperatures from 1300° to 1500° C. Accordingly, a noble metal such as Pd which is not melted at such sintering temperatures has been used as an electrode material constituting inner electrodes. However, the noble metal such as Pd is very high in cost. Consequently, when the number of inner electrodes is increased so as to achieve large capacity, the cost significantly rises, so that a cost reduction has been demanded.

Therefore, an attempt to use a low-cost base metal such as nickel as the electrode material constituting inner electrodes has been made. When inner electrodes constituted by the base metal such as nickel are used, however, the electrode material constituting the inner electrodes is liable to be oxidized. Accordingly, the dielectric material must be sintered in a reducing atmosphere. Consequently, if the dielectric material is sintered in such an atmosphere, an oxygen deficiency occurs, resulting in decreased insulation resistance.

In order to solve such a problem, a non-reduction type dielectric ceramic composition in which oxygen deficiency does not easily occur even if it is sintered in a reducing atmosphere by adding MgO and a rare earth oxide to $BaTiO_3$-$CaZrO_3$ is proposed (Japanese Patent Laid-Open Gazette No. 157603/1987).

However, the dielectric ceramic composition disclosed in Japanese Patent Laid-Open Gazette No. 157603/1987 has a disadvantage in terms of sintering properties. More specifically, it is difficult to sinter the dielectric ceramic composition unless it is sintered at temperatures of not less than 1300° C.

SUMMARY OF THE INVENTION

An object of the present invention is to provide a non-reduction type dielectric ceramic composition capable of obtaining a dielectric ceramic composition which can be sintered at relatively low temperatures and has sufficient resistance to humidity.

The dielectric ceramic composition according to the present invention contains as a main component a component expressed by the following composition formula:

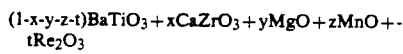

$x \leq 0.06$
$0.005 \leq y \leq 0.08$
$0.005 \leq z \leq 0.02$
$0.005 \leq t \leq 0.02$.

In the composition formula, Re indicates at least one of Y, Gd, Dy, Ho, Er and Yb.

Furthermore, the non-reduction type dielectric ceramic composition according to the present invention contains 0.3 to 5.0 parts by weight of an additive composed of at least one of $SiO_2$, $Li_2O$ and $B_2O_3$ per 100 parts by weight of the above described main component.

The reason why x is not more than 0.06 in the above described composition formula is that the rate of variation with temperature of the dielectric constant in the temperature range of −55° C. to +125° C. exceeds ±15% if the mixture ratio of $CaZrO_3$ is more than 6 mole %.

x is preferably set to not less than 0.01 nor more than 0.04. The reason for this is that the CR product is lowered, i.e., not more than 2000 when x is less than 0.01 and the change in capacitance at a high temperature (at 85° C.) becomes large when x exceeds 0.04.

Furthermore, the reason why y is not less than 0.005 nor more than 0.08 is that the CR product is lowered to not more than 1000 Ω·F., resulting in insufficient insulation resistance, thereby to make it impossible to use the dielectric ceramic composition as a multilayer capacitor if the mixture ratio of MgO is outside of this range.

y is preferably set to not less than 0.02. The reason for this is that the CR product is lowered, i.e., not more than 2000 when y is less than 0.02.

Additionally, the reason why z is not less than 0.005 nor more than 0.02 is that the rate of variation with temperature of the dielectric constant in the temperature range of −55° C. to +125° C. exceeds ±15% if the mixture ratio of MnO is less than 0.5 mole %, while the CR product is lowered if it exceeds 2.0 mole %. z is preferably set to not more than 0.015. The reason for this is that the CR product is lowered, i.e., not more than 2000 when y exceeds 0.015.

Moreover, the reason why t is not less than 0.005 nor more than 0.02 is that the rate of variation with temperature of the dielectric constant in the temperature range of −55° C. to +125° C. exceeds ±15% if the mixture ratio of $Re_2O_3$ is less than 0.5 mole %, while the sintering properties are degraded, thereby to make it difficult to sinter the dielectric ceramic composition at temperatures of not more than 1250° C. if it exceeds 2.0 mole %.

In the present invention, the dielectric ceramic composition contains an additive composed of at least one of $SiO_2$, $LiO_2$ and $B_2O_3$ to enhance the sintering properties. However, if the content of the additive per 100 parts by weight of the main component is less than 0.3 parts by weight, the dielectric ceramic composition is not sintered at a temperature of 1250° C. Consequently, not less than 0.3 parts by weight of the additive must be mixed with 100 parts be weight of the main component.

On the other hand, when the content of the additive per 100 parts by weight of the main component is more than 5.0 parts by weight, the dielectric constant ε is significantly lowered. Consequently, the upper limit of the content of the additive per 100 parts by weight of the main component is 5.0 parts by weight. Further, the content of the additive is preferably not more than 2.0 parts by weight per 100 parts by weight of the main component. The reason for this is that the CR product is lowered, i.e., not more than 2000 when the content of the additive exceeds 2.0 parts by weight.

In the present invention, 0.3 to 5.0 parts by weight of the above described particular additive is mixed with 100 parts by weight of the above described particular main component, thereby to obtain a dielectric ceramic which can be sintered at temperatures of not more than 1250° C, and shows a decreased rate of the variation with temperature of dielectric constant and a sufficiently large CR product as obvious from the embodiment as described later.

The foregoing and other objects, features, aspects and advantages of the present invention will become more apparent from the following detailed description of the present invention.

DESCRIPTION OF THE PREFERRED EMBODIMENTS

Description is now made of a non-restrictive embodiment of the present invention.

First, $BaTiO_3$, $CaZrO_3$, $MgCO_3$ and $MnCO_3$ and a rare earth oxide are weighed on the basis of respective compositions shown in Table 1 and Table 2, and an additive shown in Table 3 and Table 4 is weighed at ratios shown in the tables 3 and 4, to obtain starting materials for samples Nos. 1 to 39.

5% by weight of a water-soluble vinyl acetate binder is added to each of the starting materials for the samples Nos. 1 to 38 prepared in the above described manner, followed by wet blending for 16 hours.

A ceramic slurry obtained by the above described blending is dried at a temperature of 150° C. and then, is classified using a 60-mesh screen. Ceramic particles obtained by the classification are formed by applying a pressure of 2 t/cm², to fabricate a disk-shaped disk having a diameter of 10 mm.

The disk-shaped disc obtained is calcined at a temperature of 300° C. and in an atmosphere of air for two hours to remove the binder and then, is sintered in an atmosphere of $N_2/H_2/H_2O$ at each of the sintering temperatures shown in the tables 3 and 4 for two hours.

An In-Ga alloy is applied to both major surfaces of each of the obtained sintered bodies of the samples and is dried, to form electrodes for measurement.

Measurements are made of the dielectric constant $\epsilon$, tan $\delta$, the rate of variation with temperature of the dielectric constant Tc, and the insulation resistance IR of the ceramic sintered body having the above described electrodes for measurement formed therein. The conditions for the measurements are as follows:

The measurement of the dielectric constant $\epsilon$ is made by causing an AC current of 1.0 Vrms and 1.0 KHz to flow.

The measurement of tan $\delta$ is made by causing an AC current of 1.0 Vrms and 1.0 KHz to flow.

The measurement of the rate of variation with temperature of the dielectric constant Tc is made in the temperature range of −55° C. to +125° C. and causing an AC current of 1.0 Vrms and 1.0 KHz to flow.

The measurement of the insulation resistance IR is made after an elapse of two minutes since a current of 50 V was caused to flow.

The results of the measurements are shown in Table 5 and Table 6 as described later. In addition, the CR product is also shown in the tables 5 and 6.

Compositions A to C of the additive shown in the tables 3 and 4 are as follows:

Composition A; 100 parts by weight of $SiO_2$

Composition B; 20 parts by weight of $B_2O_3$, 40 parts by weight of BaO, 30 parts by weight of $SiO_2$, and 10 parts by weight of $Li_2O$ Composition C; 50 parts by weight of $SiO_2$, 20 parts by weight of $Li_2O$, 10 parts by weight of BaO, 10 parts by weight of CaO, and 10 parts by weight of SrO As can be seen from the tables 5 and 6, in the sintered body of the sample No. 2, the mixture ratio of $CaZrO_3$ in the main component is beyond the scope of the present invention, so that the rate of variation with temperature of dielectric constant Tc is very large.

Furthermore, in the sintered body of the sample No. 6, no additive is added, so that the dielectric ceramic composition of the sample is not sufficiently sintered even at a temperature of 1300° C., thereby to make it impossible to make the above described respective measurements.

It is found that in the sintered body of the sample No. 9, the content of the additive is high, i.e., 6.0% by weight, so that the dielectric constant $\epsilon$ is low, i.e., 2100 and the CR product is also low.

It is found that in the sintered body of the sample No. 15, the mixture ratio of MgO in the main component is high, i.e., 9.0 mole %, so that the CR product is low, i.e., 800 ΩF. In addition, it is found that in the sintered body of the sample No. 16, MgO is not contained in the main component, so that the CR product is further lowered, i.e., 500 ΩF.

In the sintered body of the sample No. 18, the mixture ratio of the rare earth oxide in the main component is high, i.e., 2.5 mole %, so that the dielectric ceramic composition of the sample is not sufficiently sintered even at a temperature of 1300° C.

In the sintered body of the sample No. 20, no rare earth oxide is contained, so that the rate of variation with temperature of the dielectric constant Tc is significantly large, i.e., −15.5% ΔC at a temperature of 125° C. In addition, it is found that in the sintered body of the sample No. 23, the mixture ratio of MnO in the main component is high, i.e., 2.5 mole %, so that the CR product is also lowered, i.e., 800 ΩF. It is found that in the sintered body of the sample No. 25, MnO is not contained, so that the rate of variation with temperature of the dielectric constant at a temperature of −55° C. is large, i.e., −16.2% ΔC.

Additionally, it is found that in the sintered bodies of the samples Nos. 26 and 27, the rare earth oxides are respectively $Ce_2O_3$ and $Sm_2O_3$, so that the rates of variation with temperature of the dielectric constant are both very large. In addition, in the sintered body of the sample No. 27, the CR product is also significantly lowered, i.e., 700 ΩF.

On the other hand, it is found that with respect to any one of the sintered bodies of the remaining samples within the scope of the present invention, the dielectric constant $\epsilon$ is relatively high, tan $\delta$ is low, i.e., not more than 0.9, the CR product representing the insulation resistance is high, i.e., not less than 1100, and the rate of variation with temperature of the dielectric constant is less than ±15%. More specifically, any one of the sintered bodies of the samples within the scope of the present invention has superior dielectric properties.

TABLE 1

| SAMPLE NUMBER | MAIN COMPONENT (MOLE %) | | | | | |
|---|---|---|---|---|---|---|
| | | | | | $Re_2O_3$ | |
| | $BaTiO_3$ | $CaZrO_3$ | MgO | MnO | TYPE | MOLE % |
| 1 | 94 | 1.0 | 3.0 | 0.5 | $Y_2O_3$ | 1.0 |
| 2 | 93 | 2.0 | 3.0 | 1.0 | $Y_2O_3$ | 1.0 |
| 3 | 91 | 4.0 | 3.0 | 1.0 | $Y_2O_3$ | 1.0 |
| 4 | 90 | 5.0 | 3.0 | 1.0 | $Y_2O_3$ | 1.0 |
| 5 | 93 | 2.0 | 3.0 | 1.0 | $Y_2O_3$ | 1.0 |
| 6 | 93 | 2.0 | 3.0 | 1.0 | $Y_2O_3$ | 1.0 |
| 7 | 93 | 2.0 | 3.0 | 1.0 | $Y_2O_3$ | 1.0 |

TABLE 1-continued

| SAMPLE NUMBER | MAIN COMPONENT (MOLE %) | | | | | |
|---|---|---|---|---|---|---|
| | BaTiO$_3$ | CaZrO$_3$ | MgO | MnO | Re$_2$O$_3$ TYPE | MOLE % |
| 8 | 93 | 2.0 | 3.0 | 1.5 | Y$_2$O$_3$ | 1.0 |
| 9 | 93 | 2.0 | 3.0 | 1.0 | Y$_2$O$_3$ | 1.0 |
| 10 | 89.5 | 2.0 | 6.0 | 0.5 | Y$_2$O$_3$ | 1.5 |
| 11 | 90 | 2.0 | 6.0 | 0.5 | Y$_2$O$_3$ | 1.5 |
| 12 | 87.5 | 2.0 | 8.0 | 1.0 | Y$_2$O$_3$ | 1.5 |
| 13 | 95.5 | 2.0 | 0.5 | 1.0 | Y$_2$O$_3$ | 1.0 |
| 14 | 95 | 2.0 | 1.0 | 1.0 | Y$_2$O$_3$ | 1.0 |
| 15 | 86.5 | 2.0 | 9.0 | 1.0 | Y$_2$O$_3$ | 1.5 |
| 16 | 96 | 2.0 | — | 1.0 | Y$_2$O$_3$ | 1.0 |
| 17 | 92 | 2.0 | 3.0 | 1.0 | Y$_2$O$_3$ | 2.0 |
| 18 | 91.5 | 2.0 | 3.0 | 1.0 | Y$_2$O$_3$ | 2.5 |
| 19 | 93.5 | 2.0 | 3.0 | 1.0 | Y$_2$O$_3$ | 0.5 |

TABLE 2

| SAMPLE NUMBER | MAIN COMPONENT (MOLE %) | | | | | |
|---|---|---|---|---|---|---|
| | BaTiO$_3$ | CaZrO$_3$ | MgO | MnO | Re$_2$O$_3$ TYPE | MOLE % |
| 20 | 96 | 0 | 3.0 | 1.0 | Y$_2$O$_3$ | — |
| 21 | 92.5 | 2.0 | 3.0 | 1.5 | Y$_2$O$_3$ | 1.0 |
| 22 | 92 | 2.0 | 3.0 | 2.0 | Y$_2$O$_3$ | 1.0 |
| 23 | 91.5 | 2.0 | 3.0 | 2.5 | Y$_2$O$_3$ | 1.0 |
| 24 | 90 | 2.0 | 6.0 | 0.5 | Y$_2$O$_3$ | 1.5 |
| 25 | 90.5 | 2.0 | 6.0 | — | Y$_2$O$_3$ | 1.5 |
| 26 | 93 | 2.0 | 3.0 | 1.0 | Ce$_2$O$_3$ | 1.0 |
| 27 | 93 | 2.0 | 3.0 | 1.0 | Sm$_2$O$_3$ | 1.0 |
| 28 | 93 | 2.0 | 2.0 | 0.5 | Er$_2$O$_3$ | 1.0 |
| 29 | 91 | 4.0 | 3.0 | 1.0 | Er$_2$O$_3$ | 1.0 |
| 30 | 89.5 | 2.0 | 6.0 | 1.0 | Er$_2$O$_3$ | 1.5 |
| 31 | 93 | 2.0 | 3.0 | 1.0 | Gd$_2$O$_3$ | 1.0 |
| 32 | 91 | 4.0 | 3.0 | 1.0 | Gd$_2$O$_3$ | 1.0 |
| 33 | 93 | 2.0 | 3.0 | 1.0 | Dy$_2$O$_3$ | 1.0 |
| 34 | 92 | 2.0 | 3.0 | 1.0 | Ho$_2$O$_3$ | 1.0 |
| 35 | 93 | 2.0 | 3.0 | 1.0 | Yb$_2$O$_3$ | 1.0 |
| 36 | 89 | 6.0 | 3.0 | 1.0 | Y$_2$O$_3$ | 1.0 |
| 37 | 88.5 | 6.5 | 3.0 | 1.0 | Y$_2$O$_3$ | 1.0 |
| 38 | 89 | 6.0 | 3.0 | 1.0 | Er$_2$O$_3$ | 1.0 |
| 39 | 95 | 0 | 3.0 | 1.0 | Er$_2$O$_3$ | 1.0 |

TABLE 3

| SAMPLE NUMBER | ADDITIVE | | SINTERING TEMPERATURE (°C.) |
|---|---|---|---|
| | COMPOSITION | % BY WEIGHT | |
| 1 | C | 0.5 | 1250 |
| 2 | C | 0.5 | 1250 |
| 3 | C | 0.5 | 1250 |
| 4 | C | 0.5 | 1250 |
| 5 | A | 0.3 | 1250 |
| 6 | — | — | 1300 |
| 7 | C | 1.0 | 1250 |
| 8 | C | 5.0 | 1250 |
| 9 | C | 6.0 | 1250 |
| 10 | C | 2.0 | 1250 |
| 11 | C | 1.0 | 1250 |
| 12 | C | 3.0 | 1250 |
| 13 | B | 0.5 | 1250 |
| 14 | B | 0.5 | 1250 |
| 15 | C | 2.0 | 1250 |
| 16 | C | 0.5 | 1250 |
| 17 | B | 0.5 | 1250 |
| 18 | B | 2.0 | 1300 |
| 19 | B | 0.5 | 1250 |

TABLE 4

| SAMPLE NUMBER | ADDITIVE | | SINTERING TEMPERATURE (°C.) |
|---|---|---|---|
| | COMPOSITION | % BY WEIGHT | |
| 20 | A | 0.5 | 1250 |
| 21 | A | 0.5 | 1250 |
| 22 | A | 0.5 | 1250 |
| 23 | A | 0.5 | 1250 |
| 24 | B | 1.0 | 1250 |
| 25 | C | 1.0 | 1250 |
| 26 | C | 1.0 | 1250 |
| 27 | C | 0.5 | 1250 |
| 28 | C | 0.5 | 1250 |
| 29 | C | 0.3 | 1250 |
| 30 | C | 0.5 | 1250 |
| 31 | A | 0.5 | 1250 |
| 32 | A | 0.5 | 1250 |
| 33 | B | 0.5 | 1250 |
| 34 | C | 0.5 | 1250 |
| 35 | C | 0.5 | 1250 |
| 36 | B | 0.5 | 1250 |
| 37 | B | 0.5 | 1250 |
| 38 | B | 0.5 | 1250 |
| 39 | B | 0.5 | 1250 |

TABLE 6

| SAMPLE NUMBER | ε | tanδ (%) | CR PRODUCT (ΩF) | TC (% ΔC) | | | |
|---|---|---|---|---|---|---|---|
| | | | | −55° C. | −25° C. | +85° C. | +125° C. |
| 1 | 3000 | 0.9 | 2100 | −9.7 | −8.0 | −8.8 | −7.2 |
| 2 | 2700 | 0.8 | 2300 | −5.6 | −4.7 | −6.1 | −5.4 |
| 3 | 3000 | 0.8 | 2000 | −3.7 | −2.0 | −9.1 | −8.0 |
| 4 | 3100 | 0.9 | 2000 | −4.9 | −0.8 | −11.2 | −10.6 |
| 5 | 3100 | 0.9 | 2400 | −5.6 | −4.6 | −8.7 | −7.2 |
| 6 | | | INSUFFICIENTLY SINTERED | | | | |
| 7 | 2800 | 0.8 | 2200 | −7.1 | −5.8 | −6.9 | −5.4 |
| 8 | 2600 | 0.8 | 1400 | −7.0 | −4.8 | −5.0 | −4.3 |
| 9 | 2100 | 0.6 | 1000 | −6.6 | −4.5 | −4.2 | −3.8 |
| 10 | 2700 | 0.8 | 2000 | −7.2 | −5.1 | −6.4 | −6.1 |
| 11 | 2800 | 0.7 | 2300 | −8.8 | −6.2 | −5.6 | −4.8 |
| 12 | 2700 | 0.7 | 1100 | −7.9 | −5.5 | −6.4 | −5.0 |
| 13 | 2700 | 0.8 | 1500 | −9.6 | −7.5 | −8.6 | −7.2 |
| 14 | 2800 | 0.7 | 1800 | −8.2 | −6.3 | −6.8 | −5.2 |
| 15 | 2200 | 0.6 | 800 | −7.3 | −5.2 | −6.8 | −4.9 |
| 16 | 2500 | 0.6 | 500 | −5.8 | −4.8 | −5.2 | −4.0 |
| 17 | 2600 | 0.6 | 1200 | −5.2 | −3.8 | −6.2 | −5.1 |
| 18 | | | INSUFFICIENTLY SINTERED | | | | |
| 19 | 3000 | 0.8 | 2000 | −5.8 | −4.9 | −8.8 | −7.6 |

TABLE 7

| SAMPLE NUMBER | ε | tanδ (%) | CR PRODUCT (ΩF) | TC (% ΔC) | | | |
|---|---|---|---|---|---|---|---|
| | | | | −55° C. | −25° C. | +85° C. | +125° C. |
| 20 | 2900 | 0.7 | 2600 | −4.2 | −3.0 | −12.5 | −15.5 |
| 21 | 2800 | 0.6 | 2100 | −5.6 | −4.8 | −6.9 | −5.3 |
| 22 | 2500 | 0.5 | 1600 | −5.3 | −3.8 | −8.8 | −7.0 |
| 23 | 2100 | 0.5 | 800 | −3.9 | −3.0 | −11.2 | −10.6 |
| 24 | 2800 | 0.7 | 2400 | −8.1 | −6.2 | −5.6 | −4.2 |
| 25 | 3100 | 0.9 | 3000 | −16.2 | −12.0 | −8.8 | −7.8 |
| 26 | 3300 | 1.0 | 1300 | −15.0 | −12.1 | −17.4 | −15.1 |
| 27 | 3100 | 0.8 | 700 | −15.8 | −13.8 | −14.6 | −12.0 |
| 28 | 3000 | 0.7 | 2100 | −7.2 | −5.5 | −7.7 | −6.5 |
| 29 | 2700 | 0.7 | 2100 | −4.8 | −3.2 | −8.7 | −7.3 |
| 30 | 2600 | 0.6 | 1900 | −6.8 | −4.6 | −6.2 | −5.1 |
| 31 | 2700 | 0.6 | 1600 | −9.6 | −7.8 | −7.2 | −5.9 |
| 32 | 2800 | 0.8 | 1700 | −9.2 | −7.2 | −8.6 | −8.0 |
| 33 | 2700 | 0.7 | 1800 | −5.9 | −4.8 | −7.7 | −6.2 |
| 34 | 2600 | 0.6 | 1500 | −6.8 | −4.9 | −7.0 | −5.9 |
| 35 | 2800 | 0.7 | 1900 | −6.9 | −5.8 | −6.8 | −6.0 |
| 36 | 2900 | 0.8 | 2300 | −3.4 | −0.6 | −13.8 | −10.1 |
| 37 | 2800 | 0.8 | 2200 | −4.8 | −1.5 | −15.6 | −13.0 |
| 38 | 2900 | 0.7 | 1900 | −6.8 | −2.8 | −14.0 | −10.5 |
| 39 | 2800 | 0.8 | 1300 | −10.0 | −8.5 | −9.0 | −7.3 |

As described in the foregoing, according to the present invention, 0.3 to 5.0 parts by weight of the above described particular additive is contained per 100 parts by weight of the above described main component having a particular composition, thereby to make it possible to provide a dielectric ceramic which can be sintered at a temperature of 1250° C. and has sufficient dielectric properties.

Therefore, a base metal such as Ni can be used as a material constituting inner electrodes if the dielectric ceramic composition according to the present invention is used, thereby to make it possible to provide a low-cost multilayer capacitor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dielectric ceramic composition comprising, 0.3 to 5.0 parts by weight of an additive composed of at least one of $SiO_2$, $Li_2O$ and $B_2O_3$ per 100 parts by weight of a main component having a composition formula of (1-x-y-z-t) $BaTiO_3 + xCaZrO_3 + yMgO + zMnO + tRe_2O_3$, where $x \leq 0.06$ $0.005 \leq y \leq 0.08$ $0.005 \leq z \leq 0.02$ $0.005 \leq t \leq 0.02$ and where Re is at least one of Y, Gd, Dy, Ho, Er and Yb.

2. A dielectric ceramic composition according to claim 1, wherein
   said x, y and z are in the respective ranges, of, $0.01 \leq x \leq 0.04$, $0.02 \leq y \leq 0.08$ and $0.005 \leq z \leq 0.015$, and
   the content of said additive is 0.3 to 2.0 parts by weight.

3. A dielectric ceramic composition according to claim 2 wherein the content of said additive is 0.5 to 2.0 parts by weight.

4. A dielectric ceramic composition according to claim 1 wherein the additive contains $SiO_2$.

5. A dielectric ceramic composition according to claim 1 wherein the additive contains $SiO_2$ and $Li_2O$.

6. A dielectric ceramic composition according to claim 1 wherein the additive contains $SiO_2$, $Li_2O$ and $B_2O_3$ and wherein Re is Y.

* * * * *